United States Patent
Wang et al.

(10) Patent No.: US 9,440,617 B2
(45) Date of Patent: Sep. 13, 2016

(54) SEATBELT PRETENSIONER

(71) Applicant: Autoliv ASP, Inc., Ogden, UT (US)

(72) Inventors: Bin Wang, Windsor, CA (US); Jon Burrow, Ortonville, MI (US); Robert Verhoven, Harsens Island, MI (US); Tim Cahill, Dryden, MI (US); Robert J. Desmarais, Washington Township, MI (US); Bradley W. Smith, Plain City, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 514 days.

(21) Appl. No.: 13/833,892

(22) Filed: Mar. 15, 2013

(65) Prior Publication Data

US 2014/0263808 A1    Sep. 18, 2014

(51) Int. Cl.
*B60R 22/40* (2006.01)
*B60R 22/46* (2006.01)

(52) U.S. Cl.
CPC ...... *B60R 22/4633* (2013.01); *B60R 2022/468* (2013.01); *B60R 2022/4638* (2013.01)

(58) Field of Classification Search
USPC ............. 242/374; 280/806, 807; 60/632–638
See application file for complete search history.

(56) References Cited

U.S. PATENT DOCUMENTS

| | | | | |
|---|---|---|---|---|
| 3,219,288 A * | 11/1965 | Stewart | ........................ | 242/370 |
| 3,881,667 A * | 5/1975 | Tandetzke | .................. | 242/384.3 |
| 3,970,266 A * | 7/1976 | Doin et al. | ..................... | 242/374 |
| 4,006,644 A * | 2/1977 | Beier | ............................ | 297/478 |
| 4,421,342 A * | 12/1983 | Brown, Jr. | ..................... | 280/740 |
| 5,823,570 A * | 10/1998 | Lane et al. | ..................... | 280/806 |
| 7,424,984 B2 * | 9/2008 | Jabusch | ........................ | 242/374 |
| 7,424,985 B2 * | 9/2008 | Stevens et al. | ............... | 242/374 |
| 7,424,986 B2 * | 9/2008 | Stevens | ........................ | 242/374 |
| 7,744,029 B2 * | 6/2010 | Gentner | ..................... | 242/379.1 |
| 2014/0263809 A1 * | 9/2014 | Nelson et al. | ................ | 242/546 |

FOREIGN PATENT DOCUMENTS

| | | |
|---|---|---|
| DE | 102007006012 | 2/2007 |
| DE | 102012214505 | 8/2012 |
| EP | 1525123 B1 | 7/2003 |
| EP | 1731386 B1 | 5/2006 |

\* cited by examiner

*Primary Examiner* — Sang Kim
(74) *Attorney, Agent, or Firm* — Brinks Gilson & Lione

(57) ABSTRACT

A system for pretensioning a seatbelt includes a minispool and a drive rod. The drive rod includes a spiral portion that, when driven along a longitudinal axis, causes the minispool to rotate about the longitudinal axis. The spiral portion of the drive rod engages the minispool, which includes corresponding structure that tracks the spiral portion. The minispool is restricted from longitudinal travel such that tracking the spiral portion causes the minispool to rotate and the drive rod passes through the minispool. In another form, the minispool can be arranged transverse to the longitudinal axis, with the translation of the drive rod causing the minispool to translate in the same direction of the drive rod. The minispool can include teeth that engage a bracket, such that the translation of the minispool causes the minispool to rotate as it translates.

12 Claims, 11 Drawing Sheets

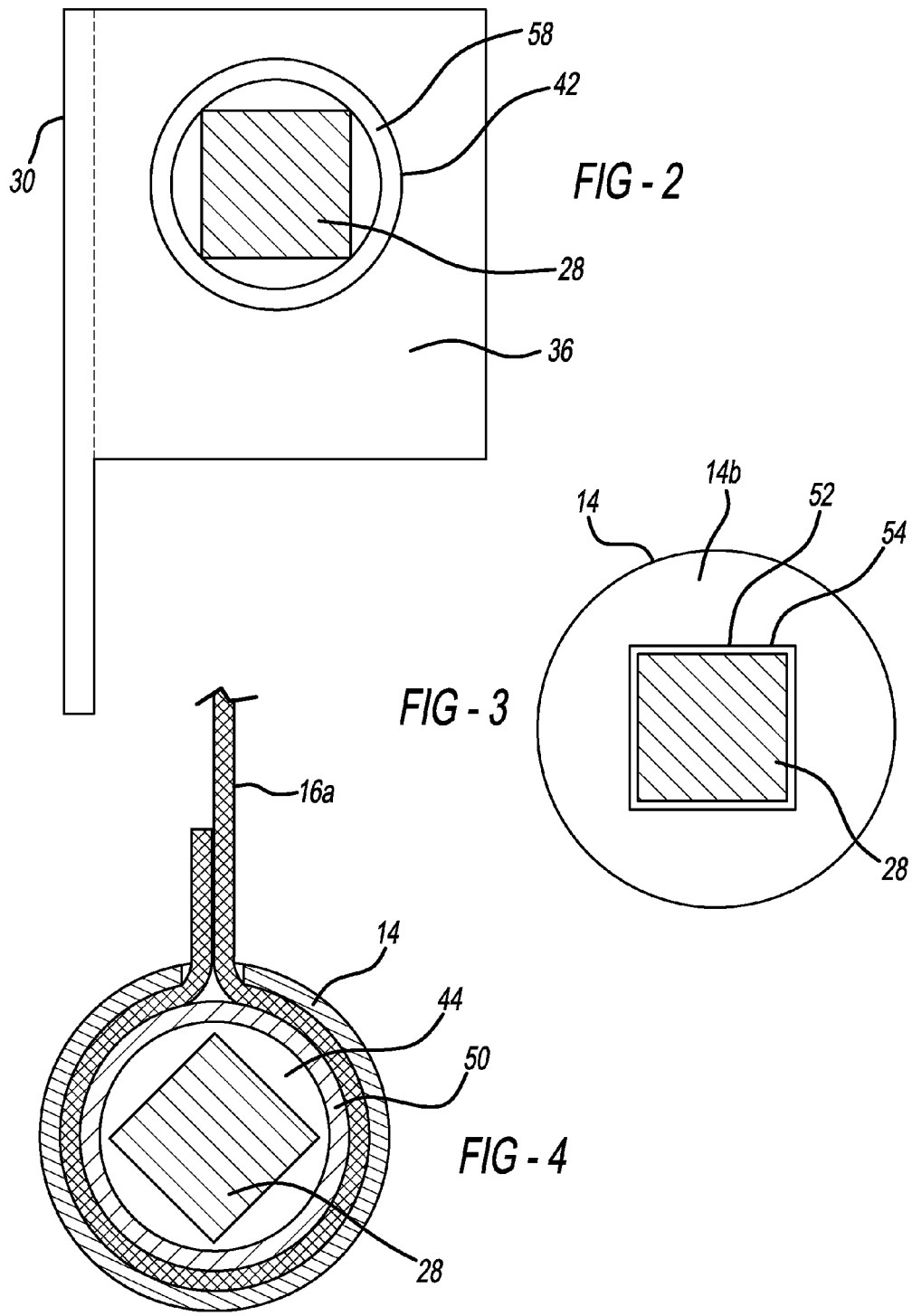

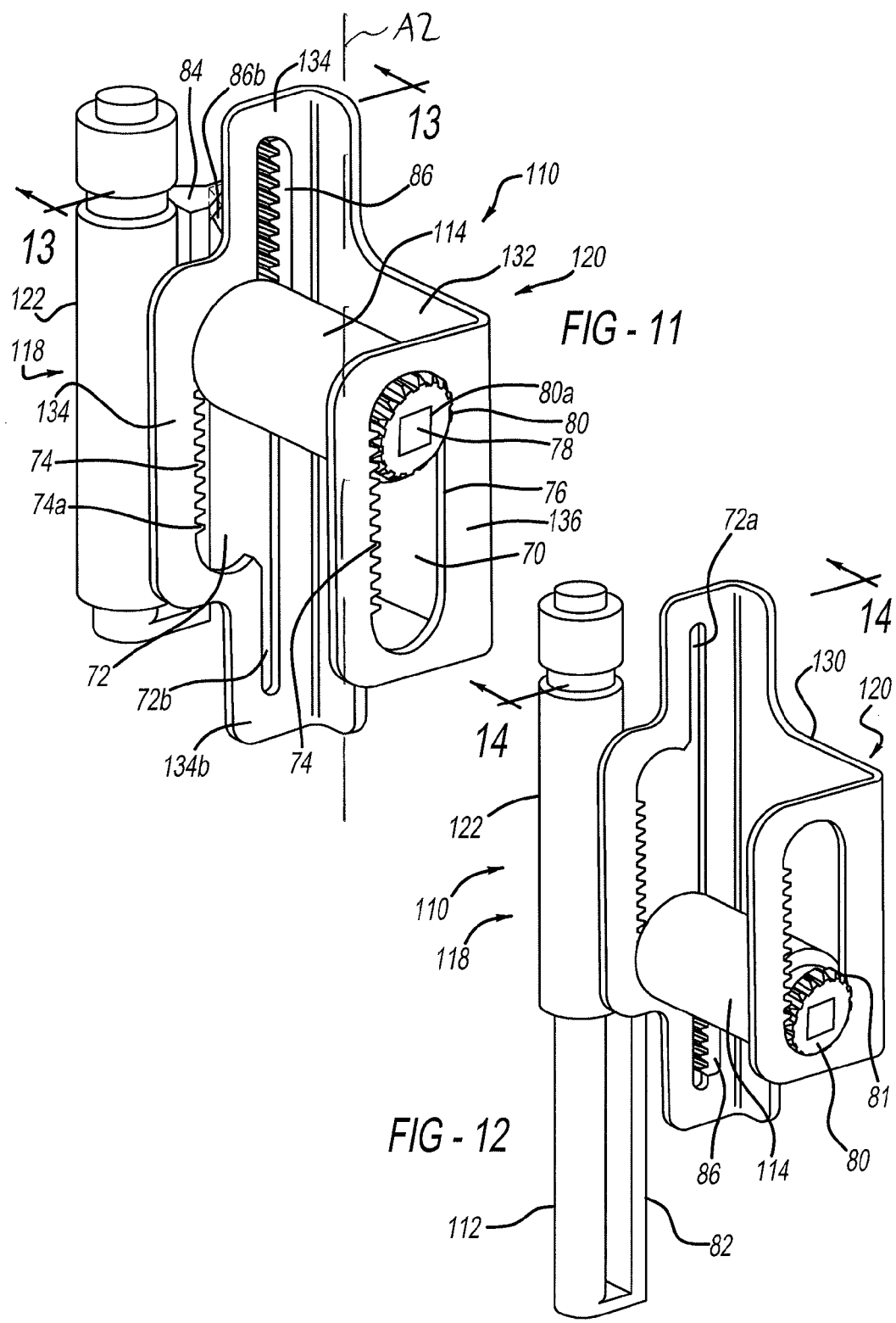

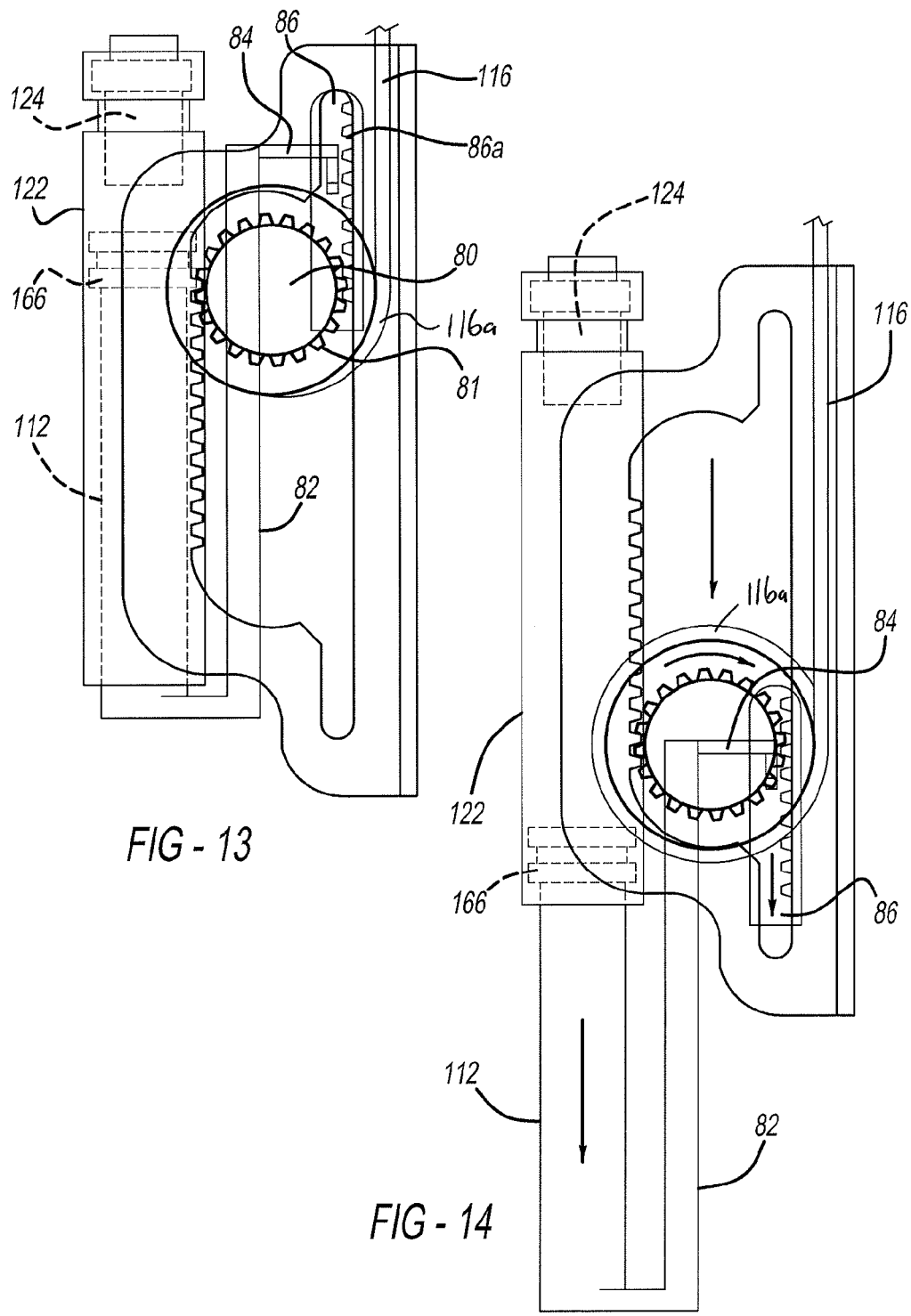

SEATBELT PRETENSIONER

BACKGROUND

1. Field of the Invention

The present embodiments relate generally to a pretensioner system for a seatbelt. More specifically, the present embodiments relate to a pyrotechnic lap pretensioner.

2. Description of Related Art

The use of seatbelt pretensioners for pretensioning a seatbelt in the event of a collision is common in the art. Pretensioners can be used, generally, to pretension a seatbelt during a collision, which will cause the seatbelt to become tighter on the occupant wearing the seatbelt. Tightening the seatbelt in the event of a collision can limit the amount that the occupant will travel forward during a crash. Pretensioners are generally activated by sensors in the vehicle that determine that a collision has occurred.

One type of pretensioners is known as a linear pretensioner, and involves the use of a piston that travels linearly, thereby linearly pulling on the lap belt in a single direction. The piston can be attached to an end of the seatbelt and, once activated, the piston will travel in a direction, pulling the seatbelt in the same direction. However, these devices are limited in the amount that the seatbelt can be pulled by the length of the piston. Space constraints with in the vehicle can limit the size and length of the piston, thereby limiting the length that the belt can be pulled.

Another type of pretensioner is in the form or a rotary pretensioner. A rotary pretensioner includes a rotatable spool or pinion having a plurality of teeth extending radially outward. The rotary pretension also includes a plurality of ball shaped weights that are housed in a tube. The tube is connected to a gas generator. In the event of a collision, the gas generator can be activated to fire the weights along a guide path toward the spool. The weights will approach the spool in a generally tangential manner, making contact with the teeth and causing the spool to rotate about a spindle. The spindle is connected to the seatbelt webbing, causing the seatbelt to become wound, thereby shortening the length of the belt and pretensioning the belt. However, this type of pretensioner requires numerous moving ball weights through a path, and the amount of winding of the spool depends on the number of ball weights. To increase the amount of available pretensioning, the number of ball weights must be increased. The vehicle cabin and seatbelt mechanisms have a limited amount of available area for installation, which conflicts the space desired for the pretensioner.

BRIEF DESCRIPTION OF THE DRAWINGS

FIG. 2 is a cross-sectional side view taken along the line 2-2 of FIG. 1;

FIG. 3 is a cross-sectional side view taken along the line 3-3 of FIG. 1;

FIG. 4 is a cross-sectional side view taken along the line 4-4 of FIG. 1;

FIG. 11 is an isometric view of a second seatbelt pretensioner in a nominal position;

FIG. 12 is an isometric view of the seatbelt pretensioner of FIG. 11 in an activated position;

FIG. 13 is a side view of the seatbelt pretensioner of FIG. 11 in the nominal position;

FIG. 14 is a side view of the seatbelt pretensioner of FIG. 11 in the activated position;

DETAILED DESCRIPTION

Figure 1:
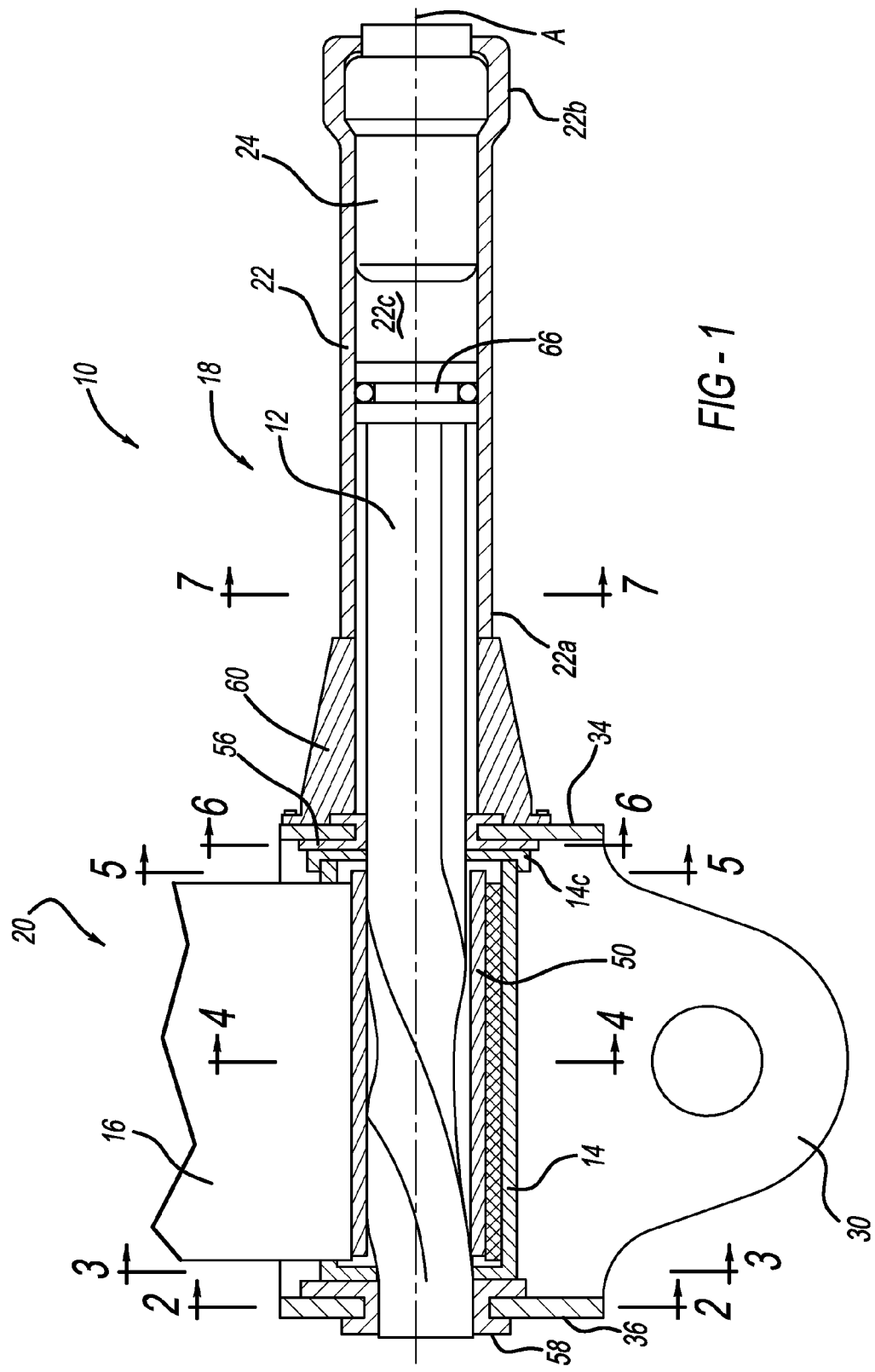
FIG. 1 is a cross-sectional plan view of a seatbelt pretensioner in a nominal position.
Figure 5:
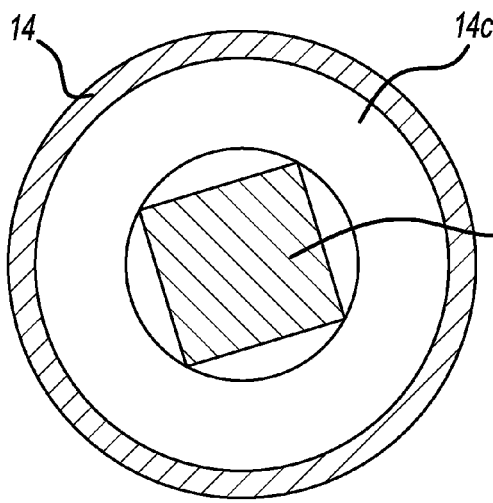
FIG. 5 is a cross-sectional side view taken along the line 5-5 of FIG. 1.
Figure 6:
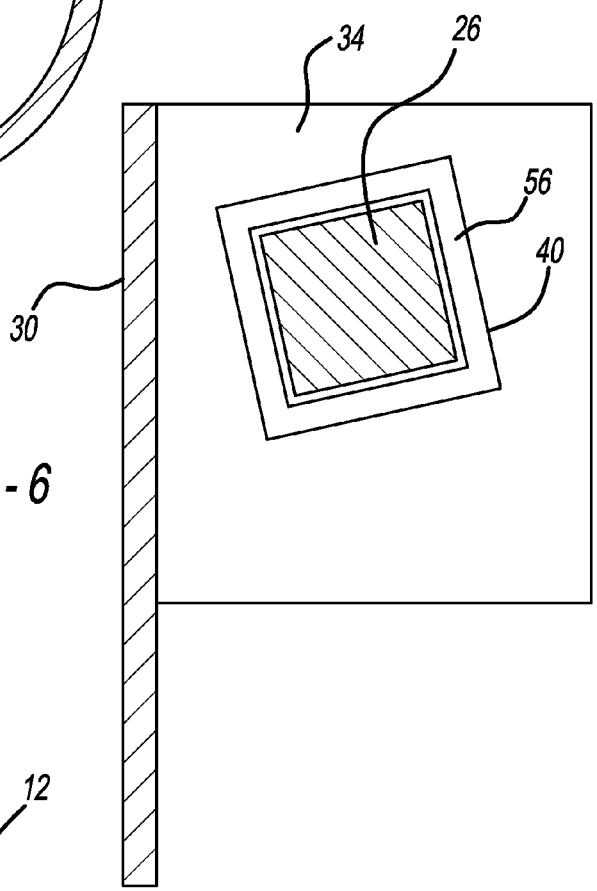
FIG. 6 is a cross-sectional side view taken along the line 6-6 of FIG. 1.
Figure 7:
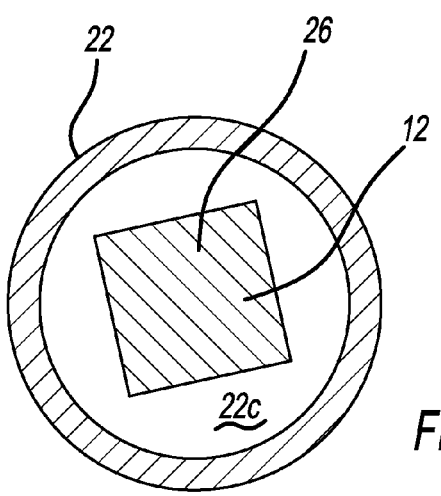
FIG. 7 is a cross-sectional side view taken along the line 7-7 of FIG. 1.

Referring now to the drawings, FIGS. 1-10 illustrate a seatbelt pretensioning device 10 having a drive rod 12 and a minispool 14, with the drive rod 12 engaging the minispool 14 to rotate the minispool 14 and pretension a seatbelt 16 mounted to the minispool 14. The device 10 includes a main longitudinal axis A, with the minispool 14 and the drive rod 12 each having central longitudinal axes that are generally coaxial with the main longitudinal axis A. Linear translation of the drive rod 12 along the axis A can be converted into rotational movement of the minispool 14 about the axis A, described in further detail below.

With reference to FIG. 1, the device 10 includes two major portions: a drive rod 12 housing portion 18 and a spool housing portion 20. The drive rod 12 housing portion 18 includes an elongate tube 22 having the drive rod 12 mounted therein for translating therealong and a gas generator 24. The tube 22 has an inner end 22a and an outer end 22b with an opening 22c extending therethrough. The gas generator 24 is mounted at the outer end 22b. The tube 22 has a central longitudinal axis that is generally coaxial with the axis A.

The spool housing portion 20 includes the minispool 14 mounted for rotation about the axis A therein. The seatbelt 16 is mounted to the minispool 14 for being wound about the minispool 14 to pretension the seatbelt 16 in response to the translation of the drive rod 12, further described below.

Figure 8:
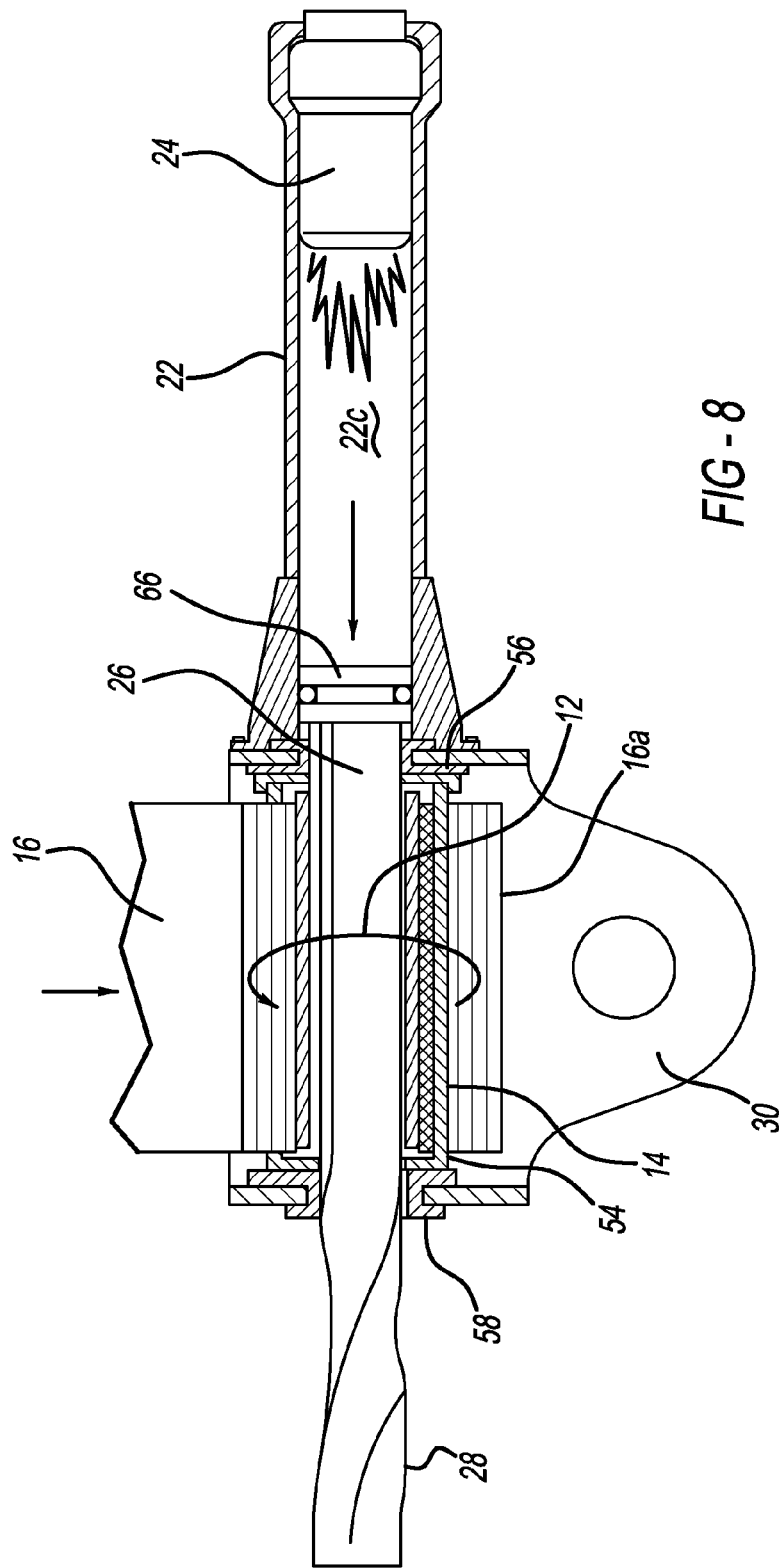
FIG. 8 is a cross-sectional plan view of the seatbelt pretensioner in an activated position.

The drive rod 12 is configured to translate from a first, nominal position (FIG. 1) to a second, activated position (FIG. 8). By translating from the nominal position to the activated position, the drive rod 12 will cause the minispool 14 to rotate and pretension the seatbelt 16 in the event of a collision.

Figure 10:
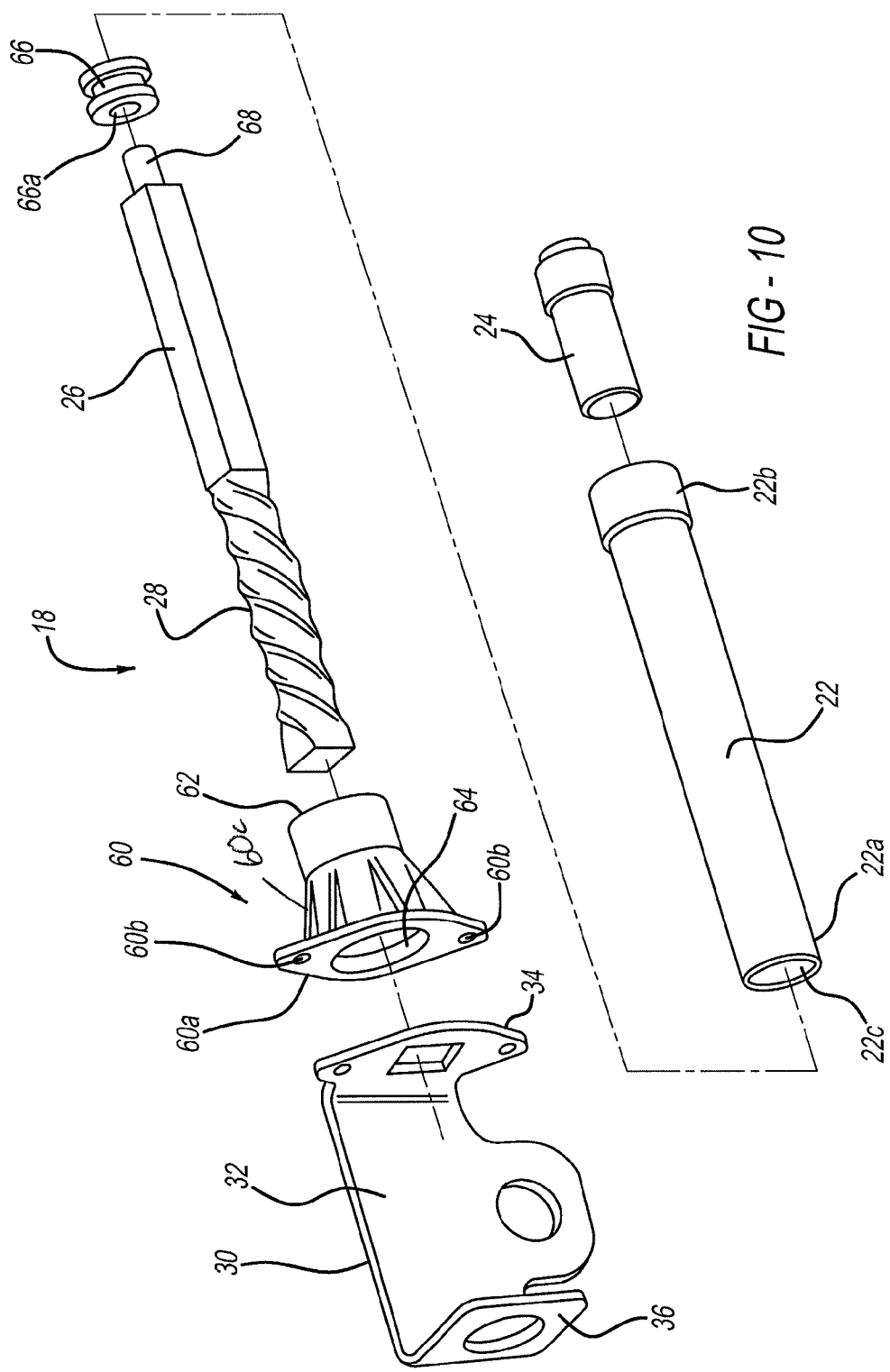
FIG. 10 is an exploded isometric view of a drive rod portion of the seatbelt pretensioner.
Figure 15:
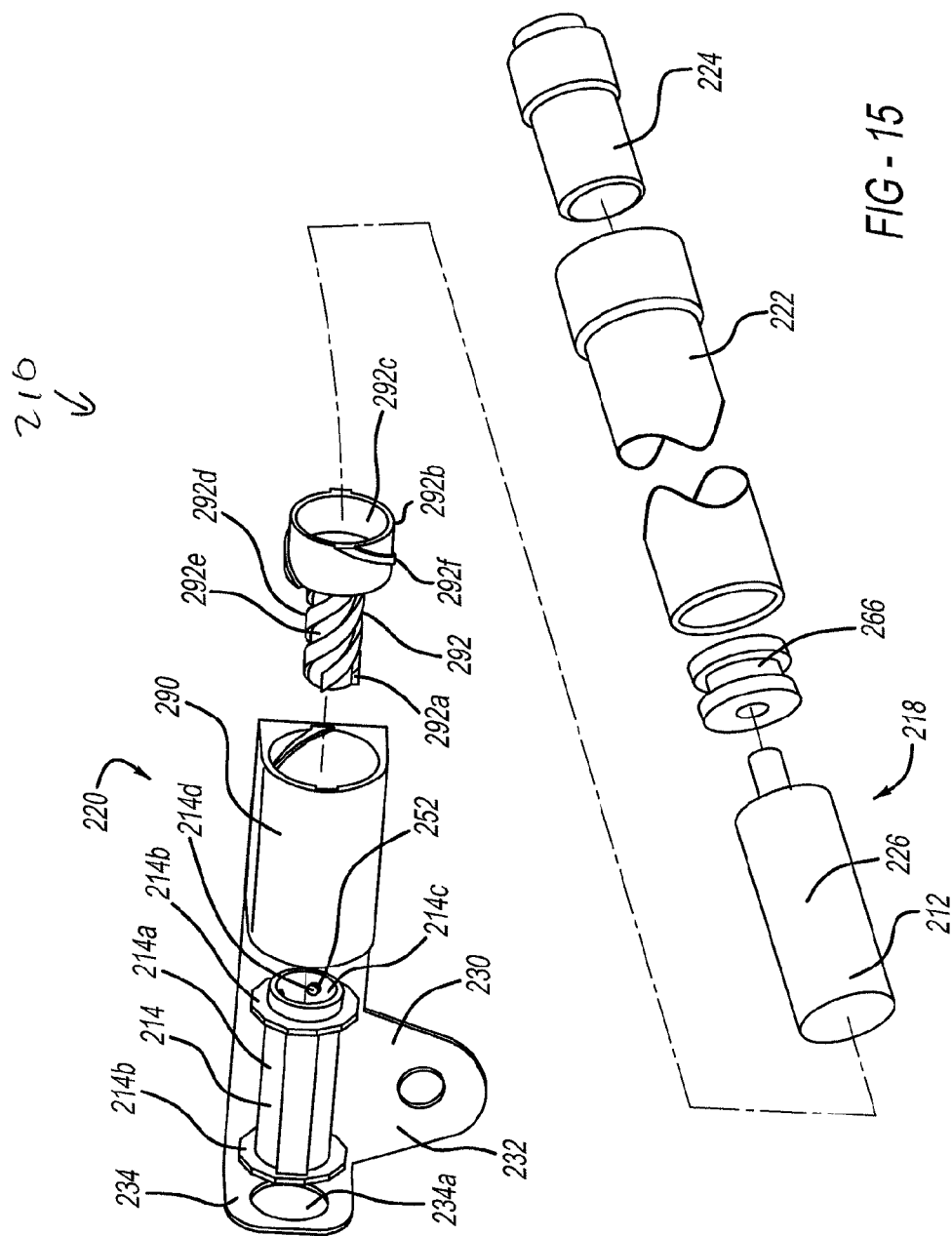
FIG. 15 is an exploded isometric view of a third seatbelt pretensioner.

With reference to FIG. 10, the drive rod 12 includes two major portions along its length: a straight portion 26 and a spiral portion 28. The straight portion 26 has a generally constant rectangular cross-section along its length. The spiral portion 28 includes a spiraling rectangular cross-section along its length, such that the spiral portion 28 includes a generally rectangular cross-section having a varying orientation along its length when viewed longitudinally. Put another way, the orientation of the cross-section is different depending on the longitudinal location of the cross-section. In the nominal position, the straight portion 26 can be disposed within the tube 22, with the spiral portion 28 being disposed within the spool housing portion 20.

Figure 9:
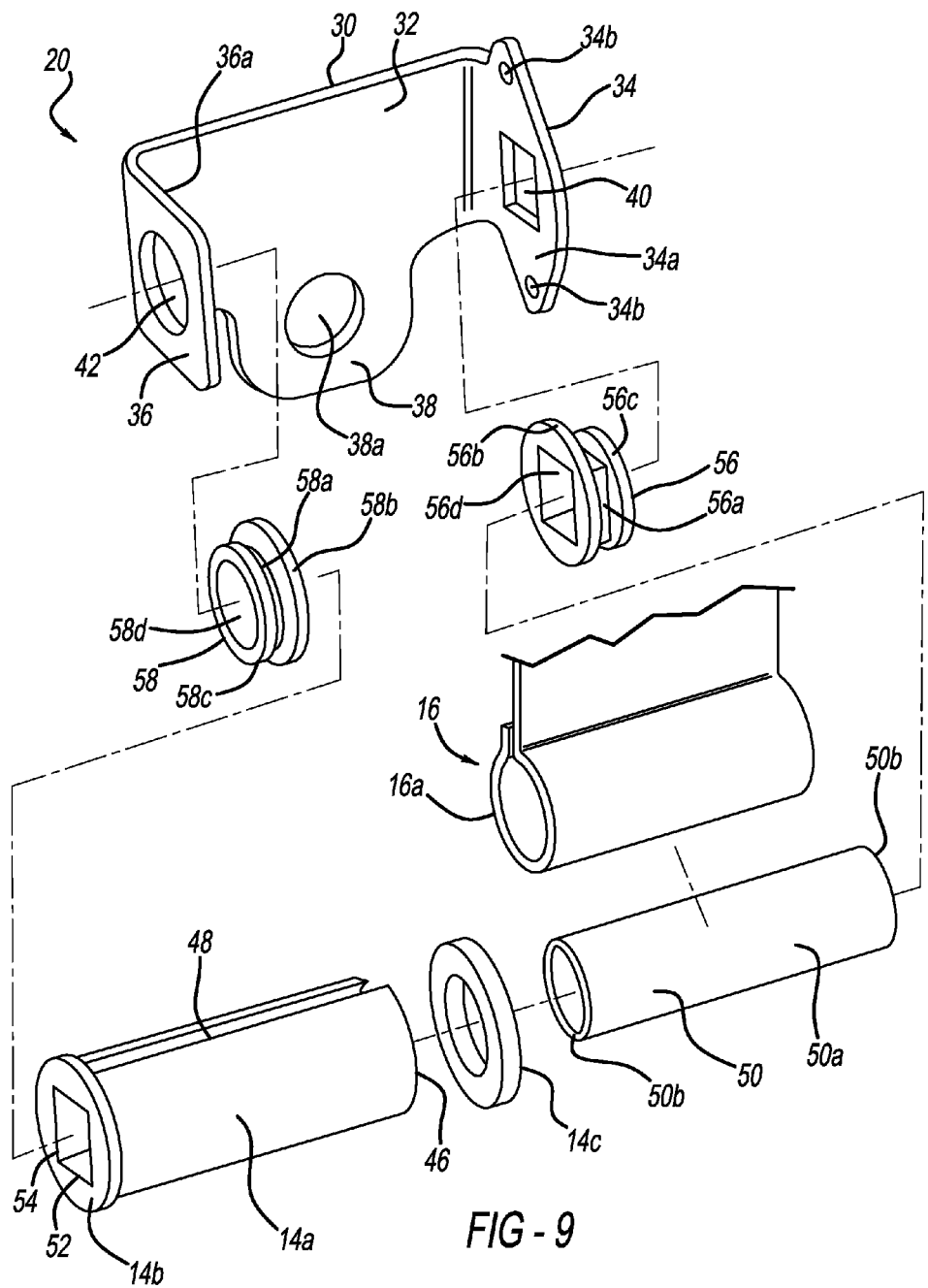
FIG. 9 is an exploded isometric view of a spool portion of the seatbelt pretensioner.

With reference to FIG. 9, the spool housing portion 20 comprises multiple components that operate in conjunction to effect rotation of the minispool 14 in response to longitudinal translation of the drive rod 12. The spool housing portion 20 includes a bracket 30 to which various components are mounted. The bracket 30 includes a base wall 32, an entry sidewall 34, and an exit sidewall 36. The entry sidewall 34 and exit sidewall 36 are generally planar and parallel to each other at opposite ends of the base wall 32, having inner surfaces 34a and 36a that face each other. The base wall 32 is generally planar and perpendicular to the sidewalls 34 and 36, and includes a tab portion 38 extending therefrom. The tab portion can be generally integrally formed and in the same plane as the base wall 32, and can include a hole 38a for mounting the bracket 30 to vehicle support structure (not shown) in a manner known in the art.

The entry sidewall 34 can have a generally diamond-shaped profile and a rectangular hole 40 therethrough generally centered on the main longitudinal axis A of the device 10. The entry sidewall 34 also includes a pair of mounting holes 34b disposed therethrough at opposite ends.

The exit sidewall 36 can have a generally rectangular profile and a generally circular hole 42 therethrough generally centered on the main longitudinal axis A of the device 10. Thus, the rectangular hole 40 and the circular hole 42 are generally aligned. This alignment allows the drive rod 12 to translate along the main longitudinal axis A and the through the holes 40 and 42.

The spool housing portion 20 includes the minispool 14, as described above. The minispool 14 has a generally cylindrical and tubular shape with a generally cylindrical sidewall portion 14a and a base wall portion 14b at one end that define a generally cylindrical cavity 44. The minispool 14 includes an opening 46 at the end opposite the base wall portion 14b for allowing other components to be inserted into the cavity 44, further described below. The minispool 14 is sized to have a length that will fit between the entry sidewall 34 and exit sidewall 36. The minispool 14 can include a cap 14c sized to fit over the opening 46 to generally enclose the cavity 44. The minispool 14 also includes a slot 48 extending through the cylindrical sidewall portion 14a and running parallel to the longitudinal axis of the minispool 14 for allowing a web portion 16a of the seatbelt 16 to extend into the minispool 14.

The spool housing portion 20 can also include a web sleeve member 50 having a generally cylindrical shape and a longitudinal axis therealong. The web sleeve member 50 has an outer diameter that is less than the inner diameter of the minispool 14. Thus, the web sleeve member 50 can be inserted within the cavity 44 and retained therein. The difference between the outer diameter of the web sleeve member 50 and the inner diameter of the minispool 14 can be sized so that the web portion 16a of the seatbelt 16 can extend through the slot 48, around the web sleeve member 50, and back out through the slot 48.

The web sleeve member 50 has a generally cylindrical sidewall 50a and openings 50b at both ends. Its inner diameter is sized so that the outer profile of the drive rod 12 and, specifically, the spiral portion 28, can extend through the web sleeve member 50 without substantial interference. However, it will be appreciated that some incidental contact may occur.

The minispool 14 further includes a driving member 52 in the form of a rectangular hole 54 through the base wall portion 14b. The rectangular hole 54 is sized slightly larger than the rectangular profile of the spiral portion 28 of the drive rod 12. The rectangular hole 54 can allow the spiral portion 28 and its rectangular profile to pass therethrough. The spiraling rectangular profile of the spiral portion 28 will cause the minispool 14 to rotate about its longitudinal axis relative to the axis of the drive rod 12, because the rectangular hole 54 will be caused to track along the spiraling rectangular profile of the spiral portion 28.

The spool housing portion 20 can also include an entry bushing 56 and an exit bushing member 58 that are each configured for mounting to the entry sidewall 34 and exit sidewall 36, respectively, of the bracket 30. The entry bushing 56 has a main body portion 56a, an inner flange portion 56b, and an outer flange portion 56c, with a rectangular through-hole 56d extending along a central axis thereof. The main body portion 56a has a rectangular outer profile that generally corresponds to the size of the rectangular hole 40 in the entry sidewall 34. The entry bushing 56 can be made from a generally flexible and resilient material, so that it can be inserted into the rectangular hole 40, with the main body portion 56a mounted within the hole 40, and the flanges 56b and 56c sandwiching the entry sidewall 34. This can create a "snap-fit" type mounting arrangement between the entry bushing 56 and the entry sidewall 34. Thus, the entry bushing 56 can create a more robust supporting arrangement between the drive rod 12 and the entry sidewall 34.

Similarly, the exit bushing member 58 has a main body portion 58a, an inner flange portion 58b, and an outer flange portion 58c, with a circular through-hole 58d extending along a central axis thereof. The main body portion 58a has a circular outer profile that generally corresponds to the size of the circular hole 42 in the exit sidewall 36. The exit bushing member 58 can be made from a generally flexible and resilient material, so that it can be inserted through the circular hole 42, with the flanges 58b and 58c sandwiching the exit sidewall 36. This can create a "snap-fit" type mounting arrangement between the exit bushing 58 and the exit sidewall 36. Thus, the exit bushing 58 can create a more robust supporting arrangement between the drive rod 12 and the exit sidewall 36. The circular through-hole 58d is sized larger than the outer profile of the spiral portion 28 to allow the drive rod 12 to translate through the through-hole 58d with limited contact or interference therebetween.

With reference again to FIG. 10, the device 10 further includes a support collar 60 mounted between the entry sidewall 34 and the tube 22. The support collar 60 includes a mounting flange 60a with a diamond shape that corresponds to the shape of the entry sidewall 34. The mounting flange 60a includes a pair of mounting holes 60b corresponding to the mounting holes 34b in the entry sidewall 34, and is mounted via a mechanical connection known in the art, such as screws, bolts, rivets, or the like. The support collar 60 includes an opening 62 extending therethrough that corresponds to the opening 22c through the tube 22, thereby allowing the drive rod 12 to translate through the tube 22 and collar 60 with limited interference. The collar 60 includes a main body portion 60c having a generally tapered outer profile that tapers down away from the mounting flange 60a. In addition to the opening 62, the mounting flange 60a includes a counter-sunk opening 64 sized large enough to accommodate the outer flange 56c of the entry bushing 56. The inner end 22a of the tube is mounted to the collar 60 at the end opposite the flange 60a.

The gas generator 24 is mounted to the outer end 22b of the tube 22. In one form, the gas generator 24 can be in the form of a micro gas generator 24, or "MGG." The gas generator 24 can provide a burst of gas outwardly therefrom to drive objects located adjacently thereto, as known in the art.

The tube 22 includes a cylindrically shaped piston 66 that is mounted within the tube opening 22c between the drive rod 12 and the gas generator 24. The piston 66 is preferably sized to conform to the size of the opening 22c in a manner known in the art to provide a generally airtight seal; however, an arrangement where the relationship between the piston 66 and tube opening 22c is not airtight may also be used. The piston 66 is preferably mounted to the straight portion 26 of the drive rod 12. The drive rod 12 can include a post 68 extending outwardly along its axis. The piston 66 can include a corresponding opening 66a for receiving the post 68 to keep the piston 66 and drive rod 12 coaxially aligned. This arrangement can cause the drive rod 12 to be driven away from the gas generator 24 in response to the gas being fired therefrom. The gas will force the piston 66 away from the gas generator 24 due to the pressure buildup within the tube 22, which forces the drive rod 12 away from the gas generator 24 and along the main longitudinal axis A.

With reference to FIGS. 1-7, having described the main components of the device 10 generally, the arrangement of the components when assembled in the nominal state will now be described. FIGS. 2-7 illustrate the arrangement of the drive rod 12 relative to various other components described herein at different locations along the main longitudinal axis A.

The piston 66 is mounted to the straight portion 26 of the drive rod 12 and between the drive rod 12 and the gas generator 24. The drive rod 12 is inserted within the tube 22, with the piston 66 and straight portion 26 being disposed within the tube 22. The gas generator 24 is mounted to the outer end 22b of the tube 22. The collar 60 is mounted to the inner end 22a of the tube 22. The spiral portion 28 of the drive rod 12 is generally disposed outside of the tube 22.

The exit bushing 58 is mounted to the exit sidewall 36. The entry bushing 56 is mounted to the entry sidewall 34. The web sleeve member 50 is inserted into the minispool 14. The web portion 16a of the seat belt is inserted through the slot 48 in the minispool 14 and wrapped around the web sleeve member 50. The minispool cap 14c is mounted to the minispool 14 for keeping the web sleeve member 50 housed therein. The minispool 14 is mounted between the entry bushing 56 and exit bushing 58. The spiral portion 28 of the drive rod 12 extends within the minispool 14, with the rectangular hole 54 of the minispool 14 engaging the outer end of the spiral portion 28 of the drive rod 12.

When assembled, each of the components described above are generally coaxially aligned along the main longitudinal axis A. The rectangular hole 54 of the minispool 14 engages the outer end of the spiral portion 28. The rectangular hole 56d through the entry bushing 56 engages the inner end of the rectangular portion 26 of the drive rod 12. The piston 66 engages the outer end of the drive rod 12, and is sized to correspond to the opening 22c of the tube 22.

With reference to FIG. 8, having the described device in the nominal position, the translation of the drive rod 12 toward the activated position will now be described.

In the event of a collision or other event causing activation of the device 10, the gas generator 24 will be caused to fire.

Upon firing, the gas generator 24 will exert a force toward the piston 66 and drive rod 12, as is known in the art. The piston 66 will receive the force from the gas generator 24 through the tube 22. Because the piston 66 is sized to correspond to the size of the opening 22c of the tube 22, the piston 66 will be forced away from the gas generator 24 due to the increased pressure in the tube 22.

The piston 66, being mounted to the end of the drive rod 12, will cause the drive rod 12 to travel away from the gas generator 24 along the longitudinal axis A. The rectangular opening 56d in the entry bushing 56, being sized to correspond to the rectangular profile of the straight portion 26 of the drive rod 12, will keep the drive rod 12 from rotating about its axis. The rectangular profile of the main body portion 56a of the entry bushing 56, being sized to fit inside of the rectangular hole 40 in the entry sidewall 34, will likewise be limited from rotation.

As the drive rod 12 is forced away from the gas generator 24, the spiral portion 28 of the drive rod 12 will travel through the rectangular opening 54 of the minispool 14. The minispool 14 is generally not restricted from rotation relative to the bracket 30. Rather, the minispool 14 is restricted from rotating at the point where the rectangular opening 54 and spiral portion 28 are engaged. If the spiral portion 28 is stationary, the minispool 14 will generally be restricted from rotation. Thus, as the spiral portion 28 travels through the rectangular opening 54, the spiraling rectangular profile of the drive rod 12 along the spiral portion 28 will cause the minispool 14 to track along the spiraling rectangular profile. The minispool 14 is generally limited from translating longitudinally along with the drive rod 12 due to the exit bushing 58 being positioned adjacent the minispool 14. Thus, the spiraling profile changes relative to the rectangular opening 54 of the minispool 14 when the drive rod 12 translates, causing the minispool 14 to rotate relative to the bracket 30.

The minispool 14 will rotate corresponding to the degree in which the profile of the drive rod 12 spirals around the spiral portion 28. As the drive rod 12 continues to be forced away from the gas generator 24, the minispool 14 will continue to rotate. The continued rotation of the minispool 14 will cause the web 16a of the seatbelt 16 to become wound around the minispool 14, thereby pretensioning the seatbelt 16.

Upon a translation of the drive rod 12 to the activated position, the rectangular hole 56d of the entry bushing 56 will engage the outer end of the straight portion 26 of the drive rod 12, and the rectangular opening 54 of the minispool 14 will engage the inner end of the spiral portion 28 of the drive rod 12. The inner end of the straight portion 26 of the drive rod, previously engaged with the rectangular opening 56d of the entry bushing 56, is now disposed generally adjacent to the rectangular opening 54 of the minispool 14. The outer end of the spiral portion 28 of the drive rod 12, previously engaged with the rectangular opening 54 of the minispool 14, will be disposed outside of and away from the bracket 30. Of course, if will be appreciated that the drive rod 12 may not translate fully to this described position, and that any amount of translation of the spiral portion 28 through the rectangular opening 54 of the minispool 14 will cause some amount of the web portion 16a to wind around the minispool 14 to effect pretensioning of the seatbelt 16.

The above description has related to the drive rod 12 being aligned coaxially with the minispool 14 to cause the minispool 14 to rotate. In an alternative embodiment, a drive rod 112 can be oriented perpendicularly to a minispool 114, causing the minispool 114 to rotate as well as translate, as further described below.

With reference to FIGS. 11-14, in one form, a pretensioner device 110 includes a drive rod housing portion 118 and a spool housing portion 120. The spool housing portion 120 includes a bracket 130 in which the minispool 114 is mounted for rotation and translation. The bracket 130 includes a base wall 132, an inner sidewall 134, and an outer sidewall 136 that are integrally formed as a unitary piece. The inner sidewall 134 and outer sidewall 136 are generally planar and parallel to each other, and are each perpendicular to the base wall 132. The inner sidewall 134 includes a first extension portion 134a and a second extension portion 134b on opposite sides thereof.

The outer sidewall 136 includes an outer longitudinal slot 70 therethrough that is generally parallel to a main longitudinal axis A2. The inner sidewall 134 includes an inner longitudinal slot 72 that is likewise oriented longitudinally. The slots 70 and 72, being on opposite sidewalls 134 and 136, are laterally aligned with each other so that the minispool 114 can be supported by and driven along the slots 70 and 72, which will be further described below. The inner slot 72 also includes a pair of first and second slot extensions 72a and 72b extending longitudinally into the first and second extension portions 134a and 134b.

The slots 70 and 72 can each include a toothed edge 74 at the edge furthest from the base wall 132 and a smooth edge 76 disposed along the edge closest to the base wall 132. However, the toothed edges 74 and smooth edges 76 could be arranged in the opposite manner, as well. The toothed edges 74 each include a plurality of teeth 74a therealong.

The minispool 114 has a generally cylindrical shape similar to the minispool 14 described above. The minispool 114 can include a slot therethrough and a web sleeve for connecting a web portion 116a of a seatbelt 116 in a similar manner. The minispool 114 also includes a pair of rectangular posts 78 extending from opposite ends of the minispool 114. A pair of pinion caps 80 having rectangular openings 80a therethrough that are sized to correspond to the posts 78 can be mounted thereon. The pinion caps 80 have teeth 81 extending radially outward. The teeth 81 are sized to correspond to the teeth 74a of the toothed edges 74 of the slots 70 and 72. When mounted, the minispool 114 will span the bracket 130, with the pinion caps 80 engaging the toothed edges 74 of the slots 70 and 72, thereby the supporting the minispool 114 and allowing for rolling translation therealong. The rolling translation caused by the engagement between the pinion caps 80 and the toothed edges 74 will cause the minispool 114 to both translate and rotate relative to the bracket 130 when a force is applied perpendicular to the central axis of the minispool 114.

The drive rod housing portion 118 includes a tube 122 similar in shape to tube 22 described above. The tube 122 can be aligned generally parallel to the longitudinal axis of the bracket 130 and perpendicular to the central axis of the minispool 114. The tube 122 is fixedly mounted to the bracket 130 or, alternatively, fixedly mounted to another component so that the bracket 130 and tube 122 remain in a generally fixed position relative to each other. The tube 122 can have a generally cylindrical shape with a cylindrical cavity therein for housing the drive rod 112. In addition to the drive rod 112, the tube 122 can include a piston 166 mounted to the end of the drive rod 112 that is proximal to a gas generator 124 within the tube 122.

The drive rod 112 can have a generally elongate shape for translating within the tube 122. In one form, the drive rod can have a generally round cross-section; however, other cross-sections, such as rectangular or another polygonal shape could also be used. A support bar 82, extending generally parallel to and along the length of the drive rod 112, is fixedly mounted to the end of the drive rod 112 opposite the gas generator 124. The support bar 82 extends along the outside of the tube 122, generally adjacent thereto. An arm portion 84 extends generally perpendicular to the support bar 82 at the end of the support bar 82 opposite its connection to the drive rod 112.

The device 110 can also include a rack member 86 configured to slide along the bracket 130. The rack member 86 has a generally elongate shape with teeth 86a disposed along its length sized to correspond with the teeth 81 of the pinion cap 80. The rack member 86 is sized to fit within the slot extensions 72a and 72b and between the pinion cap 80 and smooth edge 76 for traveling along the slot 72 and causing rolling translation of the minispool 114. In addition to slidably engaging the slot 72 and slot extensions 72a and 72b, the rack member 86 includes a tab portion 86b extending outwardly to engage the arm portion 84 extending from the support bar 82, which is mounted to the drive rod 112.

When in the nominal position shown in FIGS. 11 and 13, the drive rod 112 is housed within the tube 122, with the piston 166 adjacent the gas generator 124. The support bar 82 is likewise positioned along the side of the tube 122, with the arm portion 84 engaging the tab portion 86b of the rack member 86. The rack member 86 is disposed within the slot extension 72a, and the adjacent pinion cap 80 is engaged within the rack member 86 due to the toothed connection therebetween, with the minispool 114 disposed at the end of the slots 70 and 72 nearest the gas generator 124.

With reference to the activated position shown in FIGS. 12 and 14, upon a collision or event causing the gas generator 124 to fire, the gas generator 124 will fire gas into the tube 122, causing the piston 166 to be forced away from the gas generator 124 due to the increased pressure within the tube 122.

The piston 166 will force the drive rod 112 away from the gas generator 124. The support bar 82 will travel along with the drive rod 112 in the same direction. The arm portion 84 will force the tab portion 86b of the rack member 86 in the same direction.

The rack member 86 will slide along the slot extension 72a and slot 72, with its teeth 86a engaged within the teeth 81 of the pinion cap 80. The pinion caps 80 will roll along the toothed edges 74 of the slots 70 and 72, causing the minispool 114 to rotate as well as translate along the slots 70 and 72.

The rotation of the minispool 114 will cause the minispool 114 to wind the web portion 116a of the seatbelt 116 around the minispool 14, thereby effecting pretensioning of the seatbelt 116. In addition to the rotation of the minispool 114, the translation of the minispool 114 will also pull the seatbelt 116, providing additional pretensioning force relative to the pretensioning force provided by the rotational winding.

With reference to FIGS. 15-20, in yet another form, a drive rod 212 can again be aligned coaxially with a minispool 214 to cause the minispool 214 to rotate. Similar to the above embodiments, the device 210 includes a drive rod housing portion 218 and a spool portion 220.

The spool portion 220 includes a bracket portion 230 having a base wall 232 and a sidewall 234 that is generally perpendicular to the base wall 232. The sidewall 234 can include a circular hole 234a for providing rotational support to the minispool 214.

The spool housing portion 220 includes the minispool 214 having an elongate main body portion 214a with a generally cylindrical shape. The minispool 214 also includes a pair of circular flange portions 214b adjacent each end that extend radially outward from the main body portion. The main body portion 214a can have an outer diameter that generally corresponds to the diameter of the hole 234a in the sidewall 234 of the bracket 230, so that the minispool 14 can rotate within the hole 234a relative to the bracket 230. The minispool 214 includes a cylindrical opening 214c therein. A web portion of a seatbelt can be mounted to the minispool 214 in a manner known in the art.

The device 210 also includes a drive housing 290 that is fixedly mounted to the base wall 232 of the bracket 230. The drive housing 290 includes a generally cylindrical cavity 290a therein that is coaxially aligned with the opening 214c of the minispool 214. The drive housing 290 includes a wall portion 290b at one end of the cavity 290a, with the wall portion 290b having a circular hole 291 therethrough centered on the axis of the cavity 290a. The hole 291 is sized to receive an end of the main body portion 214a of the minispool 214 that extends past the flange portion 214b so that, when installed, the minispool 214 can rotate and be supported by the hole 291. Thus, the minispool 214 is supported by and rotates within the hole 291 of the drive housing 290 and the hole 234a of the bracket sidewall 234.

The device 210 includes the drive rod 212, which includes a driving mechanism 292 having a generally cylindrical body portion 292a and a generally cylindrical head portion 292b. The body portion 292a is sized to be received within the opening 214c of the minispool 214, with the head portion 292b having a larger diameter and sized to be received within the cavity 290a of the drive housing 290. The head portion 292b can include a cylindrical cavity 292c therein for receiving a straight portion 226 of the drive rod 212. In another form, the driving mechanism 292 of the drive rod 212 is fixedly mounted or integrally formed with the straight portion 226 of the drive rod 212. The straight portion 226 is generally disposed within a tube 222 having a gas generator 224 and piston 266, similar to those described above.

Figure 16:
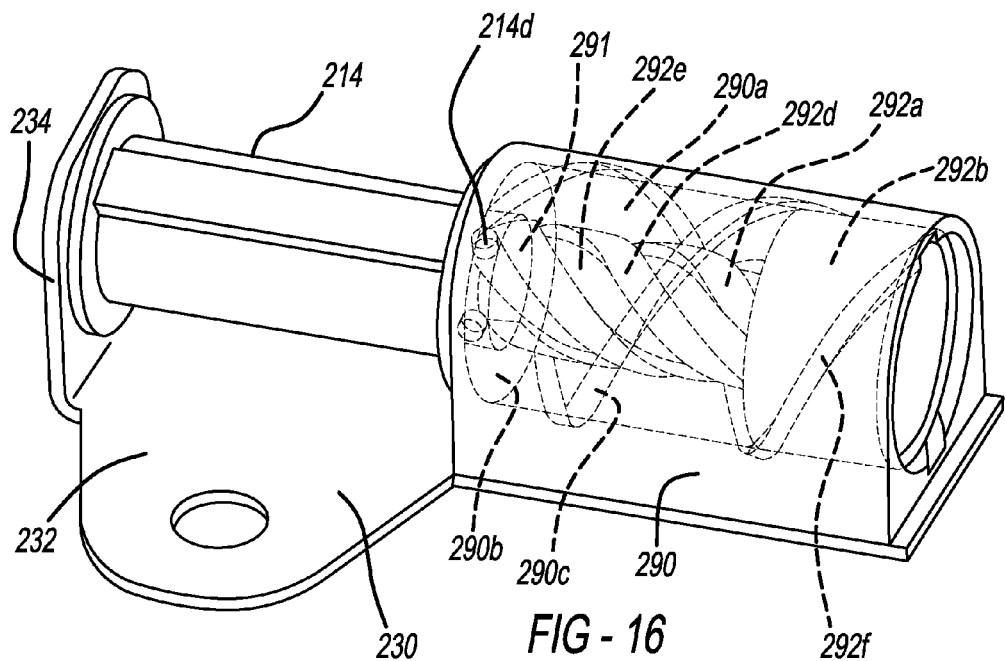
FIG. 16 is an isometric view of a spool portion of the seatbelt pretensioner of FIG. 15 in a nominal position.
Figure 17:
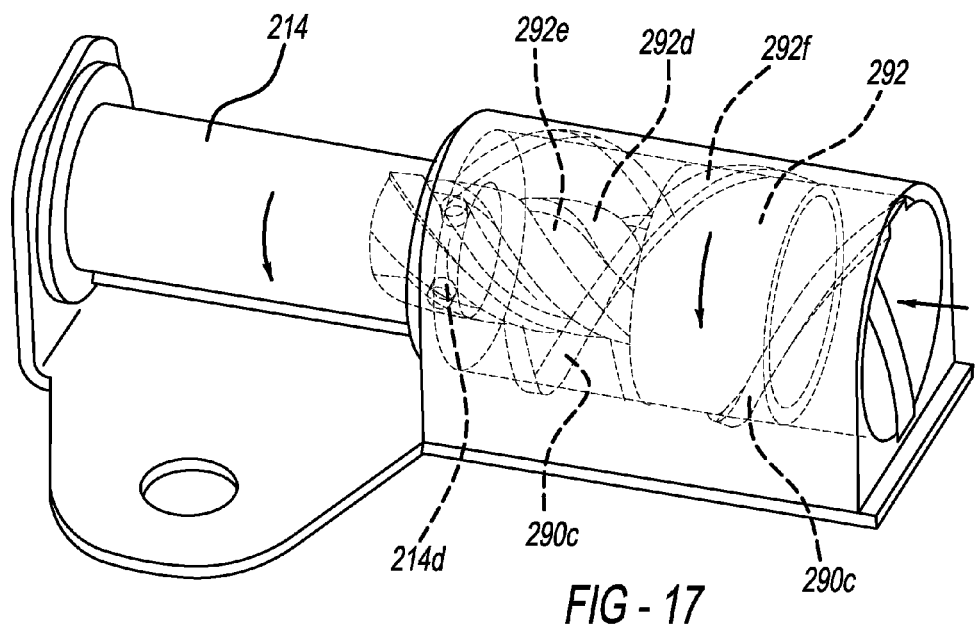
FIG. 17 is an isometric view of the spool portion of the seatbelt pretensioner of FIG. 15 in an activated position.
Figure 18:
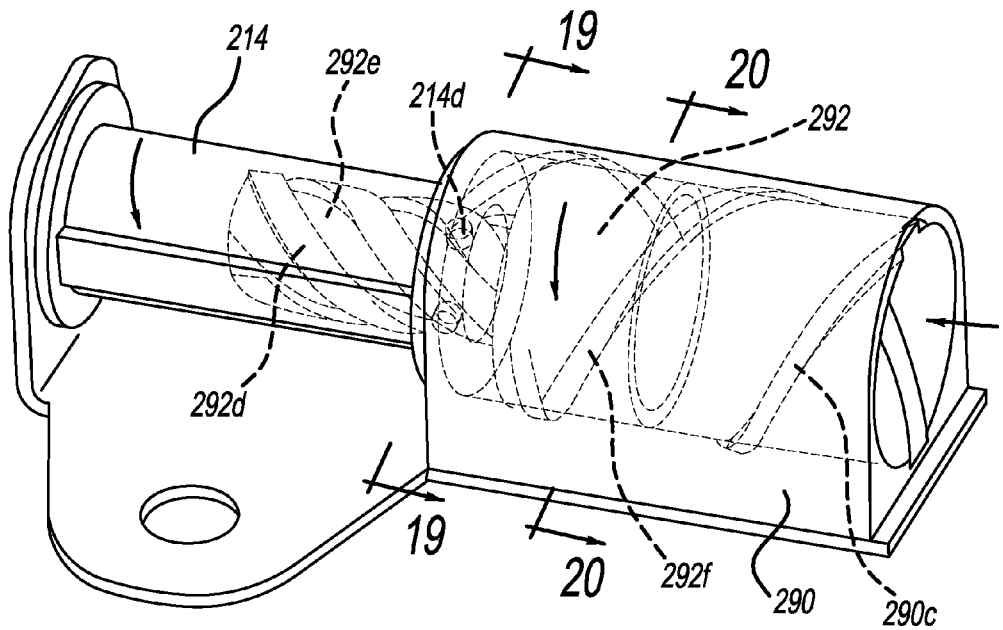
FIG. 18 is an isometric view of the spool portion of the seatbelt pretensioner of FIG. 15 in a further activated position.

With reference to FIGS. 16-18, the minispool 214 is rotated due to a combination of spiraled connections, thereby ultimately converting linear translation of the drive rod 212 to rotation of the minispool 214. The minispool 214 includes a driving portion 252 in the form of one or more round pegs 214d extending radially inward from the inner surface of the opening 214c. The drive housing 290 includes one or more spiraling channels 290c disposed on the inner surface of the cavity 290a. The driving mechanism 292 of the drive rod 212 includes a pair of spiral shaped arrangements. The body portion 292a includes one or more threads 292d extending outward from the body portion 292a, with the threads 292d defining spiral shaped channels 292e therebetween. The width of the channels 292e defined by the threads 292d generally corresponds to the width of the round pegs 214d of the minispool 214. The head portion 292b includes one or more threads 292f extending outwardly therefrom. The threads 292f have a shape and width that corresponds to the shape and width of the channels 290c in the drive housing 290.

When installed, the threads 292f of the head portion 292b are at least partially threaded into the channels 290c of the drive housing 290. The channels 292e of the main body portion 292a are adjacent to the pegs 214d of the minispool 214. In one form, the pegs 214d can be received within the channels 292e initially.

With reference to FIGS. 17 and 18, in response to a collision or other event where pretensioning is desired, the gas generator 224 will be caused to fire, causing the piston 266 and drive rod 212, including the driving mechanism 292, to be translated away from the gas generator 24. The thread and channel connection between the head portion 292b of the driving mechanism 292 and the drive housing 290 will cause the driving mechanism 292 to rotate in a first rotational direction relative to the drive housing 290 while being driven inward into the drive housing 290. The main body portion 292a of the driving mechanism 292 will likewise move inward. The peg and channel connection between the main body portion 292a and the minispool 214 will cause the minispool 214 to rotate relative to the main body portion 292a in the same rotational direction as the driving mechanism 292 is translated into the minispool 214. Thus, the driving mechanism 292 and the minispool 214 will both be caused to rotate in the same direction, thereby increasing the torque on the minispool 214. The rotation of the minispool 214 and the torque thereon is increased for a given axial stroke relative to an arrangement where only the minispool 214 rotates. The rotation of the minispool 214 will cause the web portion 216 of the seatbelt 216 to become wound and pretension the seatbelt 216, as known in the art.

Figure 19:
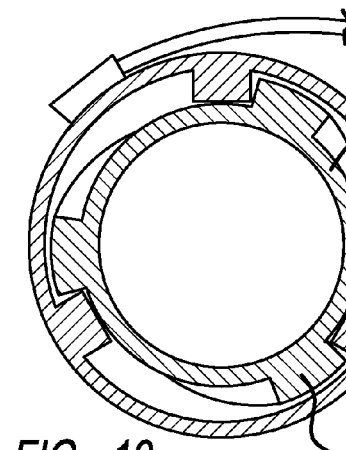
FIG. 19 is a cross-sectional side view of the seatbelt pretensioner taken along the line 19-19 of FIG. 18.
Figure 20:
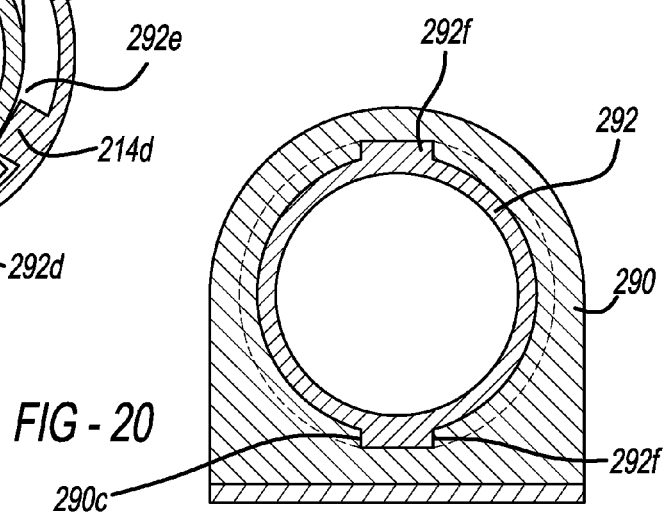
FIG. 20 is a cross-sectional side view of the seatbelt pretensioner taken along the line 20-20 of FIG. 18.

FIGS. 19 and 20 illustrate the cooperation between the driving mechanism 292, the drive housing 290, and the minispool 214 that causes the rotation of the driving mechanism 292 and the minispool 214 in the same direction.

As a person skilled in the art will readily appreciate, the above description is meant as an illustration of implementation of the principles this invention. This description is not intended to limit the scope or application of this invention in that the invention is susceptible to modification, variation, and change, without departing from the spirit of this invention, as defined in the following claims.

What is claimed is:

1. A seatbelt pretensioning system comprising:
    an elongate drive rod having a longitudinal axis therealong;
    a spiral portion of the drive rod;
    a gas generator disposed adjacent the drive rod for forcing the drive rod away from the gas generator in response to the gas generator being actuated;
    a bracket member for being fixedly mounted to a portion of a vehicle near a seatbelt;
    an elongate minispool rotatably coupled to the bracket, the minispool having a longitudinal axis being generally coaxial with the longitudinal axis of the drive rod;
    a cavity of the minispool sized to receive at least a portion of the drive rod;
    a driving portion of the minispool, sized to cooperate with and engage the spiral portion of the drive rod in response to the drive rod being forced away from the gas generator;
    wherein the engagement between the driving portion of the minispool and the spiral portion of the drive rod will cause the minispool to rotate about its longitudinal axis relative to the drive rod in response to the drive rod's translation away from the gas generator;
    wherein the linear motion of the drive rod is converted into rotational motion of the minispool for winding a web portion of the seatbelt around the minispool to pretension the seatbelt.

2. The system of claim 1, wherein the minispool remains generally longitudinally and laterally fixed relative to the bracket in response to the longitudinal translation of the drive rod causing the minispool to rotate.

3. The system of claim 1, wherein the drive rod includes a generally straight rectangular portion having a generally rectangular cross-section.

4. The system of claim 3, wherein the bracket includes a rectangular opening through a sidewall portion, the rectangular portion extends through the rectangular opening, and the rectangular opening is sized to allow the rectangular portion to translate longitudinally therethrough while substantially limiting rotation of the drive rod.

5. The system of claim 1, wherein the spiral portion of the drive rod has a generally rectangular profile and cross-section that spirals along the length of the spiral portion.

6. The system of claim 5, wherein the driving portion comprises a rectangular opening arranged generally perpendicular to the longitudinal axis of the minispool to allow the spiral portion to translate longitudinally therethrough such that the minispool will track the spiraling rectangular profile thereby being caused to rotate relative to the drive rod.

7. The system of claim 1 further comprising a tube member and a piston disposed therein, wherein the gas generator is mounted to an outer end of the tube member, the piston is mounted to the drive rod and disposed between the drive rod and the gas generator, and the piston is sized to correspond to an inner cavity of the tube such that gas generated by the gas generator will force the piston away from the gas generator to cause the drive rod to translate longitudinally away from the gas generator.

8. A seatbelt pretensioning system comprising:
an elongate drive rod having a longitudinal axis therealong;
a spiral portion of the drive rod;
a gas generator disposed adjacent the drive rod for forcing the drive rod away from the gas generator in response to the gas generator being actuated;
a bracket member for being fixedly mounted to a portion of a vehicle near a seatbelt;
an elongate minispool rotatably coupled to the bracket, the minispool having a longitudinal axis being generally coaxial with the longitudinal axis of the drive rod;
a cavity of the minispool sized to receive at least a portion of the drive rod;
a driving portion of the minispool, sized to cooperate with and engage the spiral portion of the drive rod in response to the drive rod being forced away from the gas generator;
wherein the engagement between the driving portion of the minispool and the spiral portion of the drive rod will cause the minispool to rotate about its longitudinal axis relative to the drive rod in response to the drive rod's translation away from the gas generator;
wherein the linear motion of the drive rod is converted into rotational motion of the minispool for winding a web portion of the seatbelt around the minispool to pretension the seatbelt;
a driving mechanism of the drive rod coupled to a shaft portion of the drive rod, the driving mechanism disposed between the shaft portion and the minispool and having a longitudinal axis coaxial with the longitudinal axis of the drive rod;
a head portion of the driving mechanism having a generally cylindrical shape and having a first spiral thread extending radially therefrom;
a body portion of the driving mechanism having a spiral configuration therealong, wherein the spiral portion is sized to correspond to and engage with the driving portion of the minispool;
a housing member fixedly mounted to the bracket;
a cylindrical cavity sized to correspond to the head portion and having a longitudinal axis being generally coaxial to the longitudinal axis of the drive rod;
a spiral shaped channel of the cylindrical cavity sized to correspond to the first spiral thread of the head portion such that the channel will engage the spiral thread of the head portion as the drive rod translates away from the gas generator;
wherein the driving mechanism of the drive rod is caused to rotate in a first rotational direction relative to the housing member due to the engagement between the spiral thread and the channel;
wherein the minispool is caused to rotate in the first rotational direction relative to both the housing and the driving mechanism due to the engagement between the spiral portion and the driving portion of the minispool;
wherein the linear translation of the drive rod caused by the gas generator is converted into rotational and translational movement of the driving mechanism as well as rotational movement of the minispool, and the minispool and the driving mechanism rotate in the same rotational direction.

9. The system of claim 8, wherein the spiral portion of the driving mechanism main body portion is in the form of one or more threads defining a spiral shaped channel therebetween.

10. The system of claim 8, wherein the driving portion of the minispool comprises a peg portion extending radially inward from an inner surface of the minispool cavity, and the peg portion is sized to correspond to the spiral shaped channel of the main body portion of the driving mechanism.

11. The system of claim 8, wherein the housing includes a cylindrical opening at an inner end thereof, and the minispool is received within and supported by the cylindrical opening for rotational movement relative thereto.

12. The system of claim 8, wherein the driving mechanism includes a cylindrical opening at an outer end thereof, and the shaft portion is received within the cylindrical opening for allowing the driving mechanism to rotate relative to the shaft portion.

* * * * *